US008611633B2

(12) United States Patent
Kwon et al.

(10) Patent No.: US 8,611,633 B2
(45) Date of Patent: Dec. 17, 2013

(54) METHOD FOR PROCESSING IMAGE, IMAGE PROCESSING APPARATUS AND MEDICAL IMAGE SYSTEM FOR PERFORMING THE SAME

(75) Inventors: Jae-hyun Kwon, Hwaseong-si (KR); Sung-su Kim, Yongin-si (KR); Hyun-hwa Oh, Hwaseong-si (KR); Seong-deok Lee, Seongnam-si (KR); Young-hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 13/178,838

(22) Filed: Jul. 8, 2011

(65) Prior Publication Data

US 2012/0063662 A1  Mar. 15, 2012

(30) Foreign Application Priority Data

Sep. 15, 2010  (KR) .................. 10-2010-0090785

(51) Int. Cl.
*G06K 9/00*  (2006.01)
(52) U.S. Cl.
USPC ............................ 382/132; 128/922; 378/4
(58) Field of Classification Search
USPC ......... 382/100, 128–133; 128/922; 378/4–27; 250/339.06, 492.1
See application file for complete search history.

(56) References Cited

U.S. PATENT DOCUMENTS

| | | | | |
|---|---|---|---|---|
| 5,319,719 A | * | 6/1994 | Nakazawa et al. | 382/132 |
| 5,708,693 A | * | 1/1998 | Aach et al. | 378/62 |
| 5,717,791 A | * | 2/1998 | Labaere et al. | 382/274 |
| 6,614,874 B2 | * | 9/2003 | Avinash | 378/62 |
| 7,068,826 B2 | * | 6/2006 | Jabri et al. | 382/128 |
| 7,155,044 B2 | * | 12/2006 | Vuylsteke | 382/128 |
| 7,801,265 B2 | * | 9/2010 | Yu et al. | 378/5 |
| 8,064,676 B2 | * | 11/2011 | Li et al. | 382/132 |
| 2003/0161519 A1 | * | 8/2003 | Vuylsteke | 382/128 |
| 2010/0046822 A1 | * | 2/2010 | Li et al. | 382/132 |
| 2010/0111388 A1 | | 5/2010 | Seppi et al. | |

FOREIGN PATENT DOCUMENTS

| | | |
|---|---|---|
| JP | 05-212028 | 8/1993 |
| JP | 2004-508124 | 3/2004 |
| JP | 2007-021212 | 2/2007 |
| JP | 2010-124832 | 6/2010 |
| KR | 10-2003-0067310 | 8/2003 |
| KR | 10-2008-0020616 | 3/2008 |
| WO | WO 02/22018 | 3/2002 |

* cited by examiner

*Primary Examiner* — Anand Bhatnagar
(74) *Attorney, Agent, or Firm* — NSIP Law (57) ABSTRACT

An image processing apparatus is provided. The image processing apparatus includes an extraction unit configured to extract a low-frequency band component and a high-frequency band component from a radiation image formed by passing through a subject, a contrast enhancement processing unit configured to perform a contrast enhancement process to the extracted low-frequency band component, a detail enhancement processing unit configured to perform a detail enhancement process to the extracted high-frequency band component, a synthesis unit configured to synthesize an image resulting from performing the contrast enhancement process and an image resulting from performing the detail enhancement process, and a generation unit configured to reconstruct the synthesized image and generate a diagnosis image.

24 Claims, 7 Drawing Sheets

METHOD FOR PROCESSING IMAGE, IMAGE PROCESSING APPARATUS AND MEDICAL IMAGE SYSTEM FOR PERFORMING THE SAME

CROSS-REFERENCE TO RELATED APPLICATIONS

This application claims the benefit of Korean Patent Application No. 10-2010-0090785, filed on Sep. 15, 2010 in the Korean Intellectual Property Office, the entire disclosure of which is incorporated herein by reference for all purposes.

BACKGROUND

1. Field

The following disclosure relates to a method of processing mage, an image processing apparatus, and a medical image system for performing the same.

2. Description of the Related Art

A medical image system, which uses radiation, for example, X-rays, may obtain a projected radiation image by irradiating a subject, such as a human body, with the X-rays. According to the kind and density of the subject to be irradiated or energy band of the X-rays, absorption degree of the X-rays by a material may be different. For example, an attenuation coefficient of bone is very high in comparison with that of soft tissue. Accordingly, since the contrast between soft tissue and bone is high, the soft tissue and the bone are clearly distinguished from each other in the radiation image. However, different tissues included in the soft tissue have similar attenuation coefficients with respect to X-rays having a single energy band so that they may also have similar intensities in the radiation image. Therefore, it may be difficult to distinguish the more than one tissues constituting the soft tissue in the radiation image.

SUMMARY

Provided is a method of processing an image for generating a diagnosis image, an image processing apparatus, and a medical image system for performing the same.

Provided is a non-transitory computer readable medium where a program for performing the method may be stored.

In one general aspect, an image processing apparatus is provided. The image processing apparatus includes an extraction unit configured to extract a low-frequency band component and a high-frequency band component from a radiation image formed by passing through a subject, a contrast enhancement processing unit configured to perform a contrast enhancement process to the extracted low-frequency band component, a detail enhancement processing unit configured to perform a detail enhancement process to the extracted high-frequency band component, a synthesis unit configured to synthesize an image resulting from performing the contrast enhancement process and an image resulting from performing the detail enhancement process, and a generation unit configured to reconstruct the synthesized image and generate a diagnosis image.

The contrast enhancement processing unit may include a reference determining unit configured to determine a reference point for dividing the low-frequency band component into a plurality of regions according to a brightness level, and a contrast stretching applying unit configured to apply contrast stretching to each of the plurality of regions divided according to the determined reference point for the extracted low-frequency band component.

The reference determining unit may determine at least one reference point for dividing the low-frequency band component into the plurality of regions, and the reference point corresponds with a brightness level for differentiating tissues according to a radiation attenuation coefficient for each energy band of the tissues constituting the subject.

The contrast stretching applying unit may perform the contrast stretching to a component having a lower brightness level than the reference point and a component having a higher brightness level than the reference point in a different technique for each of the plurality of regions divided according to the reference point, divides the brightness level on the basis of the reference point for each of the plurality of regions, and applies the contrast stretching by using a result of performing the contrast stretching and a result of dividing the brightness level for each of the plurality of regions.

The contrast enhancement processing unit may further include an enhancement degree determining unit configured to determine a degree of enhancing contrast of the low-frequency band component.

The enhancement degree determining unit may determine the enhancing contrast degree based on a ratio indicating the contrast enhancement degree of the low-frequency band component, a weight for each of the plurality of regions divided from the low-frequency band component on the basis of the reference point, or a combination thereof.

The contrast enhancement processing unit may further include an adding unit configured to add the plurality of regions to which the contrast stretching is applied by referring to the determined contrast enhancement degree.

The detail enhancement processing unit may include a threshold value determining unit configured to determine a threshold value for dividing an edge region having directivity and a noise region not having directivity in the high-frequency band component, and an edge region emphasizing unit configured to emphasize the edge region resulting from the determined threshold value.

The threshold value determining unit may further determine at least one threshold value for dividing the edge region into a plurality of edge regions according to intensity of an edge included in the edge region, and the edge region emphasizing unit adaptively applies a degree of emphasis according to the intensity of the edge included in each of the plurality of edge regions resulting from the determined at least one threshold value.

The edge region emphasizing unit may increase the emphasis degree as the intensity of the edge included in each of the plurality of edge regions decreases.

The edge region emphasizing unit may emphasize the edge region by reducing the noise region resulting from the determined threshold value.

The image processing apparatus may further include a detection unit configured to detect the radiation image formed by passing through the subject for each of at least two energy bands. The extraction unit may extract the low-frequency band component and the high-frequency band component from each of the detected radiation images for each of the at least two energy bands.

The contrast enhancement process may be different from the detail enhancement process.

A number of the reference point corresponds with a number of the plurality of regions.

The synthesis unit synthesizes the images based on a fusion rule.

In another general aspect, a medical image system in provided. The medical image system may include a radiation image capturing unit configured to radiate a radiation to a subject and obtain a plurality of radiation images of the subject for a plurality of energy bands, an image processing apparatus configured to extract a low-frequency band component and a high-frequency band component from each of the obtained radiation images, perform a contrast enhancement process to the extracted low-frequency band component, perform a detail enhancement process to the extracted high-frequency band component, synthesize images resulting from performing the contrast enhancement process and images resulting from performing the detail enhancement process, and generate a diagnosis image based on reconstructing the synthesized image, and a display unit configured to display the generated diagnosis image.

The image processing apparatus may divide each of the low-frequency band components into a plurality of regions according to a brightness level and applies contrast stretching to each of the divided plurality of regions.

The image processing apparatus may divide each of the high-frequency band components into a plurality of edge regions and noise regions according to intensity of an edge and may adaptively emphasize the edge region according to the intensity of the edge included in each of the plurality of edge regions.

In yet another general aspect, a method of processing an image is provided. The method of processing an image includes extracting a low-frequency band component and a high-frequency band component from a radiation image formed by passing through a subject, performing a contrast enhancement process to the extracted low-frequency band component, performing a detail enhancement process to the extracted high-frequency band component, synthesizing an image resulting from performing the contrast enhancement process and an image resulting from performing the detail enhancement process, and generating a diagnosis image based on reconstructing the synthesized image.

The performing of the contrast enhancement process may divide each of the low-frequency band components into a plurality of regions according to a brightness level and applies contrast stretching to each of the divided plurality of regions.

The performing of the detail enhancement process may divide each of the high-frequency band components into a plurality of edge regions and noise regions according to intensity of an edge and adaptively emphasizes the edge region according to the intensity of the edge included in each of the plurality of edge regions.

The method may further include detecting the radiation image formed by passing through the subject for each of at least two energy bands. The extracting may extract the low-frequency band component and the high-frequency band component from each of the detected radiation images for each of the at least two energy bands.

A non-transitory computer readable recording medium where a computer program for performing the method of claim 16 may be stored.

In yet another general aspect, a method of processing an image is provided. The method of processing an image includes detecting radiation images, formed by passing radiation through a subject, corresponding to each of a plurality of energy band components, extracting frequency band components corresponding with each of the energy band components for each radiation image, enhancing each of the frequency band components corresponding with one energy band component, each energy band component performing a different enhancing operation, synthesizing an image based on the enhancing operation of each frequency band component of each radiation image, and storing the synthesized image. Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
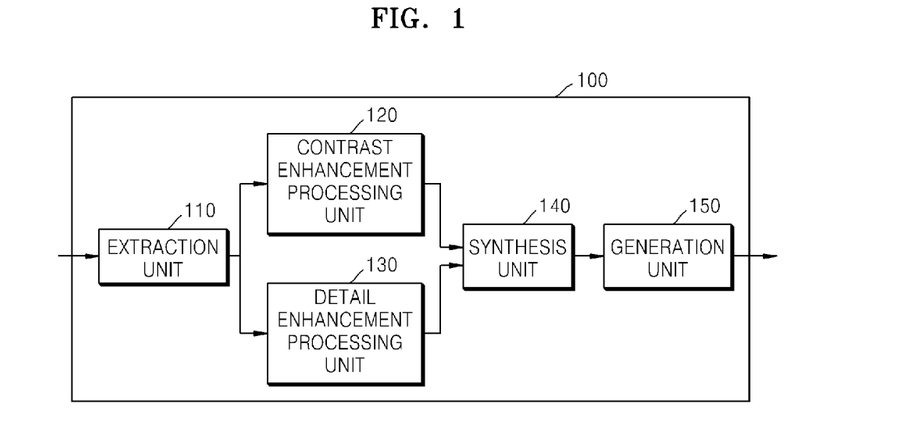
FIG. 1 is a diagram illustrating an example of an image processing apparatus.

FIG. 1 illustrates an example of an image processing apparatus 100. Referring to FIG. 1, the image processing apparatus 100 includes an extraction unit 110, a contrast enhancement processing unit 120, a detail enhancement processing unit 130, a synthesis unit 140, and a generation unit 150.

Elements related to the example are illustrated in FIG. 1. However, it is understood that besides the elements illustrated in FIG. 1 other elements may be further included.

The extraction unit 110, the contrast enhancement processing unit 120, the detail enhancement processing unit 130, the synthesis unit 140, and the generation unit 150 of the image processing apparatus 100 may correspond to a single processor or a plurality of processors. The processor may be implemented with an array of a plurality of logic gates, or may be implemented with a combination of a general microprocessor and a memory where a program to be executed by the microprocessor is stored. It is also understood that the processor may be implemented with another form of hardware.

The image processing apparatus 100 performs pre-set operations to an image formed by passing through a subject. The image which was formed by passing through the subject may be a radiation image.

The extraction unit 110 extracts a low-frequency band component and a high-frequency band component from the radiation image formed by passing through the subject. The extraction unit 110 may extract the low-frequency band component and the high-frequency band component by performing a multi-scale decomposition process to the radiation image.

For example, the multi-scale decomposition process may be performed according to a wavelet transform. In other words, by performing the wavelet transform to the radiation image formed by passing through the subject, the radiation image is divided into an approximation sub-band corresponding to the low frequency and a detail sub-band corresponding to the high frequency. The detail sub-band includes a vertical sub-band, a horizontal sub-band, and a diagonal sub-band.

However, the multi-scale decomposition process is not limited to the wavelet transform. The multi-scale decomposition process may be performed using a process other than the wavelet transform, such as, for example, a Contourlet transform considering various directivities of an edge and a Laplacian pyramid.

In a non-limiting example, the extraction unit 110 may also extract the low-frequency band component and the high-frequency band component by performing the scale decomposition process to the radiation image, for example, about two to three times. In another example, the extraction unit 110 may also extract the low-frequency band component and the high-frequency band component by performing the scale decomposition process to the radiation image four or more times.

Accordingly, the extraction unit 110 may extract the low-frequency band component and the high-frequency band component by performing the prescribed process to the radiation image formed by passing through the subject.

The contrast enhancement processing unit 120 may perform a contrast enhancement process to the low-frequency band component extracted by the extraction unit 110. The contrast enhancement process may clarify a difference between a dark region and a bright region of the image.

Accordingly, the contrast enhancement processing unit 120 brightens the dark region of the low-frequency band component and darkens the bright region of the low-frequency band component so that the contrast for the low-frequency band component may be improved.

For example, the contrast enhancement processing unit 120 determines a reference for dividing the low-frequency band component into a plurality of regions according to a brightness level. The contrast enhancement processing unit 120 may perform the contrast enhancement process to the low-frequency band component by applying contrast stretching to each of the regions divided according to the determined reference.

The detail enhancement processing unit 130 performs a detail enhancement process to the high-frequency band component extracted by the extraction unit 110.

For example, the detail enhancement processing unit 130 determines a threshold value for dividing an edge region having directivity and a noise region not having directivity in the high-frequency band component and emphasizes the edge region according to the determined threshold value.

The detail enhancement processing unit 130 may further determine at least one threshold value for dividing the edge region according to edge intensity included in the edge region and may adaptively apply an emphasis degree according to the edge intensity included in the edge region according to the determined threshold value. In other words, the detail enhancement processing unit 130 increases the emphasis degree of the edge region more as the edge intensity included in the edge region decreases. The edge intensity indicates a size of a coefficient of the edge, and the emphasis degree indicates a degree of increasing the coefficient.

The detail enhancement processing unit 130 may also emphasize the edge region by reducing the noise region according to the determined threshold value.

Accordingly, since the detail enhancement processing unit 130 emphasizes the edge and reduces noise in the high-frequency band component, the high-frequency band component may be improved.

The synthesis unit 140 synthesizes an image resulting from performing the contrast enhancement process in the contrast enhancement processing unit 120 and an image resulting from performing the detail enhancement process in the detail enhancement processing unit 130. The synthesis unit 140 may perform the synthesis operation by applying a fusion rule to bands of the image resulting from performing the contrast enhancement process and the image resulting from performing the detail enhancement process.

The generation unit 150 reconstructs the image synthesized by the synthesis unit 140 and generates a diagnosis image. In a non-limiting example, the diagnosis image may indicate an image for diagnosing whether materials, such as a lesion or mass, exist; however, the diagnosis image is not limited to this example and the diagnosis image may include all radiation images formed by passing through the subject.

For example, in the case of extracting the low-frequency band component and the high-frequency band component by performing the wavelet transform in the extraction unit 110, the generation unit 150 performs an inverse wavelet transform to reconstruct the synthesized image and generates the diagnosis image according to a result of the reconstruction.

However, it is understood that the generation unit 150 is not limited to performing the inverse wavelet transform, and the generation unit 150 may use various reconstruction methods based on, for example, various processes performed by the extraction unit 110.

Accordingly, the image processing apparatus 100 may generate highly clear diagnosis images with improved picture quality. For example, in the case that the subject is a breast, the image processing apparatus 100 may perform the image process for obtaining a diagnosis image to determine whether there is a lesion in the breast tissue.

Figure 2:
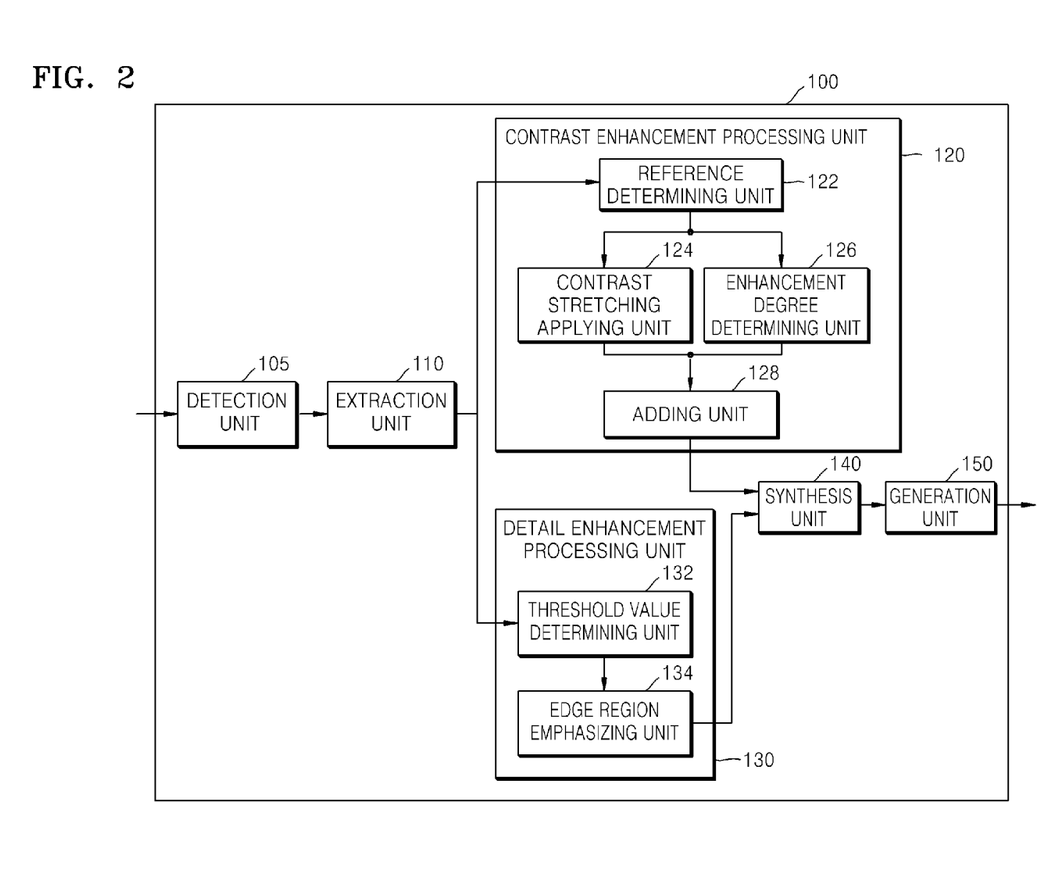
FIG. 2 is a diagram illustrating the example of the image processing apparatus.

FIG. 2 is a diagram illustrating the image processing apparatus 100. Referring to FIG. 2, the image processing apparatus 100 includes a detection unit 105, the extraction unit 110, the contrast enhancement processing unit 120, the detail enhancement processing unit 130, the synthesis unit 140, and the generation unit 150. The contrast enhancement processing unit 120 includes a reference determining unit 122, a contrast stretching applying unit 124, an enhancement degree determining unit 126, and an adding unit 128. The detail enhancement processing unit 130 includes a threshold value determining unit 132 and an edge region emphasizing unit 134.

Elements related to the image processing apparatus 100 are illustrated in FIG. 2. However, it is understood that besides the elements illustrated in FIG. 2 other elements may be further included.

The image processing apparatus 100 illustrated in FIG. 2 corresponds to the example of the image processing apparatus 100 illustrated in FIG. 1. Accordingly, the image processing apparatus 100 is not limited to the units illustrated in FIG. 2. Since the above description related to FIG. 1 is applicable to the image processing apparatus 100 illustrated in FIG. 2, overlapped explanations are omitted.

The image processing apparatus 100 performs pre-set processes for improving picture quality of the radiation image formed by passing through the subject.

The detection unit 105 detects the radiation image formed by passing through the subject corresponding to each of at least two energy bands. It is understood that the detection unit 105 may be a detector capable of discriminating energy.

For example, if the radiation, including a plurality of energy bands, is passed through the subject, the detection unit 105 detects the radiation image formed by passing through the subject corresponding to each of at least two energy bands. The radiation, including energy bands to be radiated to the subject, may include all of multi-energy X-rays or polychromatic X-rays.

For example, in the case that the radiation, including energy bands, is radiated to the breast, each of the detected plurality of radiation images may be data corresponding with a mammogram.

The detection unit 105 may also detect three radiation images corresponding with three energy bands. However, the detection unit 105 may not be limited to this and may detect plural radiation images for plural energy bands according to conditions of use.

The extraction unit 110 extracts the low-frequency band component and the high-frequency band component from the radiation image formed by passing through the subject. In the case that the radiation images are detected corresponding to two or more energy bands through the detection unit 105, the extraction unit 110 extracts the low-frequency band component and the high-frequency band component from each of the radiation images.

In a non-limiting example, the extraction unit 110 may also extract the low-frequency band component and the high-frequency band component by performing the wavelet transform or the like after performing a global contrast enhancement process to the radiation image formed by passing through the subject; however, the extraction unit 110 is not limited to this.

The contrast enhancement processing unit 120 performs the contrast enhancement process to the low-frequency band component extracted by the extraction unit 110. The contrast enhancement process may be a local contrast enhancement process; however, the contrast enhancement process is not limited to the local contrast enhancement process. Referring to FIG. 2, the contrast enhancement processing unit 120 includes the reference determining unit 122, the contrast stretching applying unit 124, the enhancement degree determining unit 126, and the adding unit 128.

The reference determining unit 122 determines the reference for dividing the low-frequency band component extracted by the extraction unit 110 to a plurality of regions according to a level of brightness. For example, the reference determining unit 122 determines at least one reference point for dividing the low-frequency band component to the plurality of regions.

The reference point may be the brightness level for differentiating the tissues according to a radiation attenuation coefficient for each energy band of the tissues constituting the subject. The reference point may be the brightness level for differentiating the tissues on the basis of a ratio of the radiation attenuation coefficient for each energy band of the tissues constituting the subject.

For example, in the case that the subject is a breast, the subject may be composed of microcalcification tissues and soft tissues. The soft tissues may include glandular tissues, adipose tissues, masses, fibrous tissues, or a combination thereof. Accordingly, the reference determining unit 122 may determine at least one reference point referring to the radiation attenuation coefficient for each energy band of the above tissues.

Therefore, the reference determining unit 122 may determine four reference points for distinguishing the above five kinds of tissues from each other. However, the reference determining unit 122 is not limited to the four reference points for distinguishing the five kinds of tissues.

In another example, in the case that the subject is a breast, the subject may be composed of fat tissues, glandular tissues, and Infiltrating Ductal Carcinoma (IDC). Accordingly, the reference determining unit 122 may determine at least one reference point referring to the radiation attenuation coefficient for each energy band of the above tissues.

Therefore, the reference determining unit 122 may determine two reference points for distinguishing the above three kinds of tissues from each other; however, the reference determining unit 122 is not limited to the two reference points for distinguishing the above three kinds of tissues.

Also, the reference point may be differently determined for each radiation image corresponding to each of the energy bands detected by the detection unit 105. For example, the reference determining unit 122 may determine the reference point for each of the plural radiation images for the plural energy bands. The reference points according to the energy bands may be the same or different.

The process of determining the reference point at the reference determining unit 122 will be described referring to FIG. 4.

As described above, the reference determining unit 122 determines the reference point for dividing the low-frequency band component to the plurality of regions according to the brightness level.

The contrast stretching applying unit 124 applies the contrast stretching to each of the plurality of regions divided by the reference determining unit 122. The contrast stretching may be normalization for changing a range of intensity values of pixels. In other words, the contrast stretching extends the range of brightness level of each pixel constituting the image so that the image includes all ranges of brightness level.

The contrast stretching applying unit 124 performs the contrast stretching to a component having the brightness level lower than the reference point and a component having the brightness level higher than or equal to the reference point in a different technique for each of the plurality of regions divided according to the reference point. The contrast stretching applying unit 124 also divides the brightness level on the basis of the reference point for each of the plurality of regions. Accordingly, the contrast stretching applying unit 124 applies the contrast stretching to each of the plurality of regions based on a result of performing the contrast stretching and a result of dividing the brightness level.

According to the above description, the contrast stretching applying unit 124 may perform operations expressed as Equations (1) to (3).

Equation (1) indicates a method of using different contrast stretching techniques on the basis of the reference point in the contrast stretching applying unit 124.

$$R_n = \begin{cases} \dfrac{x - P_n}{P_{n+1} - P_n}, & \text{if } x < P_{n+1} \\ \dfrac{P_{n+1} - x}{1 - P_{n+1}}, & \text{if } x \geq P_{n+1} \end{cases} \quad (1)$$

In Equation (1), x may be the brightness level of an inputted pixel normalized to 1, $R_n$ may be the brightness level of an outputted pixel, $P_n$ may be the reference point determined by the reference determining unit 122, and n may be the number of reference points. N is an integer equal to 0 or greater. In the case that the brightness level of the inputted pixel is normalized to 1, $P_0$ may become 0 and $P_n$ may become 1.

By performing the operation according to Equation (1), the contrast stretching applying unit 124 applies the contrast stretching to each of the plurality of regions divided according to the reference point.

In response to the contrast stretching being applied, the dark portion becomes brightened and the bright portion becomes darkened. Since the contrast stretching applying unit 124 applies the contrast stretching to each of the regions divided according to the reference point, the effect of the contrast stretching may be improved.

In other words, the contrast stretching applying unit 124 performs the contrast stretching to the component having the brightness level lower than the reference point and the component having the brightness level higher than or equal to the reference point in a different technique.

Therefore, the effect of the contrast stretching by the contrast stretching applying unit 124 may be improved.

Equation (2) represents a method of dividing the brightness level according to the reference point in the contrast stretching applying unit 124. For example, Equation (2) makes the brightness level become 0 or 1 on the basis of the reference point for the low-frequency band component.

$$S_n = \begin{cases} 1, & \text{if } P_n < x \le P_{n+1} \\ 0, & \text{otherwise} \end{cases} \quad (2)$$

In Equation (2), x may be the brightness level of the inputted pixel normalized to 1, $S_n$ may be the brightness level of the outputted pixel, $P_n$ may be the reference point, and n may be the number of reference points.

In other words, by performing the operation according to Equation (2), the contrast stretching applying unit 124 divides each of the plurality of regions included in the low-frequency band component according to brightness on the basis of the reference point determined by the reference determining unit 122.

Equation (3) represents a method of applying the contrast stretching by using the result of performing the contrast stretching according to Equation (1) and the result of dividing brightness level according to Equation (2) at the contrast stretching applying unit 124.

$$\begin{cases} T_n = R_n \cdot S_n, & \text{if } x < P_{n+1} \\ K_n = R_n \cdot (1 - S_n), & \text{if } x \ge P_{n+1} \end{cases} \quad (3)$$

In Equation (3), $R_n$ may be an output data of Equation (1), $S_n$ may be an output data of Equation (2), n may be the number of reference points, and $T_n$ and $K_n$ may be the brightness level of the output pixel of the contrast stretching applying unit 124.

However, the contrast stretching applying unit 124 may make $S_n$, for example, the output of Equation (2), pass through a low pass filter so that a boundary line is not generated at the plurality of regions divided according to brightness. In this case, it is understood that the output data, for example, $T_n$, of the contrast stretching applying unit 124 may be a result of multiplying $S_n$, which has passed through the low pass filter, by $R_n$, and $K_n$ may be a result of multiplying $R_n$ by a difference between 1 and $S_n$, which has passed through the low pass filter.

The process of applying the contrast stretching to each of the plurality of regions divided according to the reference point determined by the reference determining unit 122 at the contrast stretching applying unit 124 will be described referring to FIGS. 5 and 6.

The enhancement degree determining unit 126 determines a degree of enhancing contrast for the low-frequency band component extracted by the extraction unit 110. For example, the enhancement degree determining unit 126 may determine the degree of enhancing contrast by using at least one of a ratio indicating the contrast enhancement degree of the low-frequency band component and a weight for each of the plurality of regions.

The ratio indicating the contrast enhancement degree and the weight will be described in connection with the adding unit 128 with reference to Equation (4).

The adding unit 128 adds the plurality of regions to which the contrast stretching is applied by the contrast stretching applying unit 124 by referring to the contrast enhancement degree determined by the enhancement degree determining unit 126.

The adding unit 128 may perform an operation expressed as Equation (4).

$$y = (1 - \alpha) \cdot x + \alpha \cdot \sum_n (lW_n \cdot T_n + hW_n \cdot K_n) \quad (4)$$

In Equation (4), $\alpha$ may be the ratio indicating the contrast enhancement degree, $T_n$ and $K_n$ may be the brightness level of the output pixel of the contrast stretching applying unit 124 (for example, the output data of Equation (3)), $W_n$ may be the weight for each of the regions divided according to the reference point determined by the reference determining unit 122, n may be the number of reference points determined by the reference determining unit 122, and y may be an output data of the adding unit 128.

For example, $W_n$ becomes the weight for each of the plurality of regions divided according to the reference point determined by the reference determining unit 122. $W_n$ may include $lW_n$ and $hW_n$.

$lW_n$ may be a weight applied in response to the brightness level of the input pixel being lower than the reference point determined by the reference determining unit 122, and $hW_n$ may be a weight applied in response to the brightness level of the input pixel being higher than or equal to the reference point determined by the reference determining unit 122.

$W_n$ (hereinafter, $W_n$ includes both $lW_n$ and $hW_n$) may be set high for a part to be enhanced among the plurality of regions. Accordingly, $W_n$ may have a value ranging from −1 to 1.

$W_n$ may also be differently set for each of the plurality of regions divided by the reference determining unit 122. For example, in the case that the subject is a breast, for finding out masses included in the breast tissues, $W_n$ for a region where the masses are included among the plurality of regions divided by the reference point may be set high. Accordingly, the masses may be easily detected in the diagnosis image generated by the image processing apparatus 100.

For example, $\alpha$ is the ratio indicating the contrast enhancement degree. In other words, for a portion to which the contrast enhancement process is to be strongly performed among the plurality of regions, $\alpha$ may be set high. Accordingly, $\alpha$ may have a value ranging from 0 to 1.

For example, in the case of enhancing an original image, α may be set low; and in the case of strongly performing the contrast enhancement process, α may be set high.

Also, in a non-limiting example, it is understood that α may be equally set for all the plurality of regions divided by the reference determining unit 122 or, may be differently set for each of the plurality of regions.

Accordingly, the adding unit 128 may output the component obtained by performing the contrast enhancement process to the low-frequency band component extracted by the extraction unit 110.

Therefore, since the contrast enhancement processing unit 120 applies the contrast stretching to each of the plurality of regions divided according to the reference point for the low-frequency band component, the images with enhanced contrast may be outputted.

The detail enhancement processing unit 130 performs the detail enhancement process to the high-frequency band component extracted by the extraction unit 110. Referring to FIG. 2, the detail enhancement processing unit 130 includes the threshold value determining unit 132 and the edge region emphasizing unit 134.

The threshold value determining unit 132 determines the threshold value for dividing the edge region having directivity and the noise region not having directivity in the high-frequency band component.

For example, the threshold value determining unit 132 determines at least one threshold value by referring to the coefficient of the high-frequency band component extracted by the extraction unit 110.

For example, in the case that the extraction unit 110 performs the wavelet transform, since the edge region has directivity, the coefficient of the edge region has a relatively high value in comparison with the noise region not having directivity. Therefore, the threshold value determining unit 132 determines one threshold value for dividing the edge region and the noise region by referring to the coefficient of the high-frequency band component.

The threshold value determining unit 132 may also further determine one or more threshold values for dividing the edge region into a plurality of edge regions according to the edge intensity included in the edge region. In other words, the threshold value determining unit 132 determines a first threshold value to an n-th threshold value by referring to the coefficient of the high-frequency band component. Herein, it is understood that the edge intensity indicates higher intensity as the coefficient of the edge increases.

For example, the coefficient of the component included in the edge region has a high value and the coefficient of the component included in the noise region has a low value, the threshold value determining unit 132 determines a plurality of threshold values based on an average value or a standard deviation of the coefficients. Accordingly, the threshold value determining unit 132 may determine sequential first threshold value to n-th threshold value.

The n-th threshold value, for example, the threshold value having the smallest value among the one or more threshold values, may be the threshold value for dividing the edge region and the noise region.

The above description may be expressed as Equation (5).

$$\begin{cases} \text{edge\_1} & \text{if } x > \text{threshold}_1 \\ \text{edge\_2} & \text{if } x > \text{threshold}_2 \\ \quad\vdots \\ \text{edge\_n} & \text{if } x > \text{threshold}_n \\ \text{noise} & \text{otherwise} \end{cases} \quad (5)$$

In Equation (5), $\text{threshold}_1$, $\text{threshold}_2$, and $\text{threshold}_n$ respectively corresponds with the first threshold value, the second threshold value, and the n-th threshold value. x corresponds with the coefficient of an inputted band, and edge_1, edge_2, edge_n, and noise respectively correspond with a first edge region, a second edge region, an n-th edge region, and the noise region.

For example, in the case that the high-frequency band component is extracted by performing the wavelet transform in the extraction unit 110, x may be the coefficient of each band according to performing the wavelet transform. However, it is understood that x is not limited to this and may also become the coefficient of each band even in the case that the high-frequency band component is extracted in another way.

In Equation (5), the n-th threshold value becomes the threshold value for dividing the edge region and the noise region.

Therefore, the threshold value determining unit 132 determines the threshold value for dividing the edge region and the noise region and also the threshold value for dividing the edge region to the first edge region to the nth edge region according to the edge intensity.

The edge region emphasizing unit 134 emphasizes the edge region extracted by using the threshold value determined by the threshold value determining unit 132. The edge region emphasizing unit 134 may also adaptively apply the emphasis degree according to the edge intensity included in each of the plurality of edge regions according to the at least one threshold value determined by the threshold value determining unit 132.

For example, the edge region emphasizing unit 134 may perform an operation expressed as Equation (6).

$$q(x) = \begin{cases} P_1 \cdot x & \text{if } x > \text{threshold}_1 \\ P_2 \cdot x & \text{if } x > \text{threshold}_2 \\ \quad\vdots \\ P_n \cdot x & \text{if } x > \text{threshold}_n \\ 0 & \text{otherwise} \end{cases} \quad (6)$$

In Equation (6), $\text{threshold}_1$, $\text{threshold}_2$, and $\text{threshold}_n$ respectively correspond with the first threshold value, the second threshold value, and the n-th threshold value. $P_1$, $P_2$, and $P_n$ respectively correspond with a first emphasis coefficient, a second emphasis coefficient, and an nth emphasis coefficient. x corresponds with the coefficient of the inputted band.

As above-expressed in Equation (6), the band having a larger coefficient than the first threshold value, the band having a larger coefficient than the second threshold value, and the band having a larger coefficient than the n-th threshold value are respectively multiplied by the adaptive emphasis coefficients $P_1$ to $P_n$.

For example, the edge region emphasizing unit 134 calculates the coefficient for an input band included in the first edge region by multiplying the input band included in the first edge region by the first emphasis coefficient, calculates the coefficient for an input band included in the second edge region by multiplying the input band included in the second edge region by the second emphasis coefficient, and calculates the coefficient for an input band included in the n-th edge region by multiplying the input band included in the nth edge region by the n-th emphasis coefficient. The edge region emphasizing unit 134 also makes the coefficient of the noise region become 0.

The emphasis coefficient $P_n$ may be larger than 0. The higher the edge intensity is, the smaller the emphasis degree is.

As described above, the edge region emphasizing unit 134 may increase the emphasis degree of the edge region more as the edge intensity included in each of the plurality of edge regions according to the threshold value determined by the threshold value determining unit 132 decreases. The edge region emphasizing unit 134 may also reduce the noise region according to the threshold value determined by the threshold value determining unit 132.

Therefore, since the detail enhancement processing unit 130 emphasizes the edge and reduces noise in the high-frequency band component, the images with improved image may be outputted.

The synthesis unit 140 synthesizes the image resulting from performing the contrast enhancement process in the contrast enhancement processing unit 120 and the image resulting from performing the detail enhancement process in the detail enhancement processing unit 130. The synthesis unit 140 performs the synthesis of the image resulting from performing the contrast enhancement process and the image resulting from performing the detail enhancement process, and also synthesizes the radiation images for the plurality of energy bands detected by the detection unit 105 as one image.

The synthesis unit 140 may perform the synthesis operation based on the application of a fusion rule. For example, in the case that the extraction unit 110 performs the wavelet transform, the synthesis unit 140 synthesizes a plurality of images for each sub-band resulting from the wavelet transform according to the fusion rule such as an average value of the pixel coefficient, a maximum value of the pixel coefficient, and a value maximizing the contrast. Since the fusion rule is understood within the teachings herein, an explanation is omitted.

The generation unit 150 reconstructs the image synthesized by the synthesis unit 140 to generate the diagnosis image. For example, in the case that the extraction unit 110 performs the wavelet transform, the generation unit 150 may perform the inverse wavelet transform to reconstruct the synthesized image and generate the diagnosis image.

Accordingly, the image processing apparatus 100 may generate the diagnosis image with improved picture quality.

Figure 3:
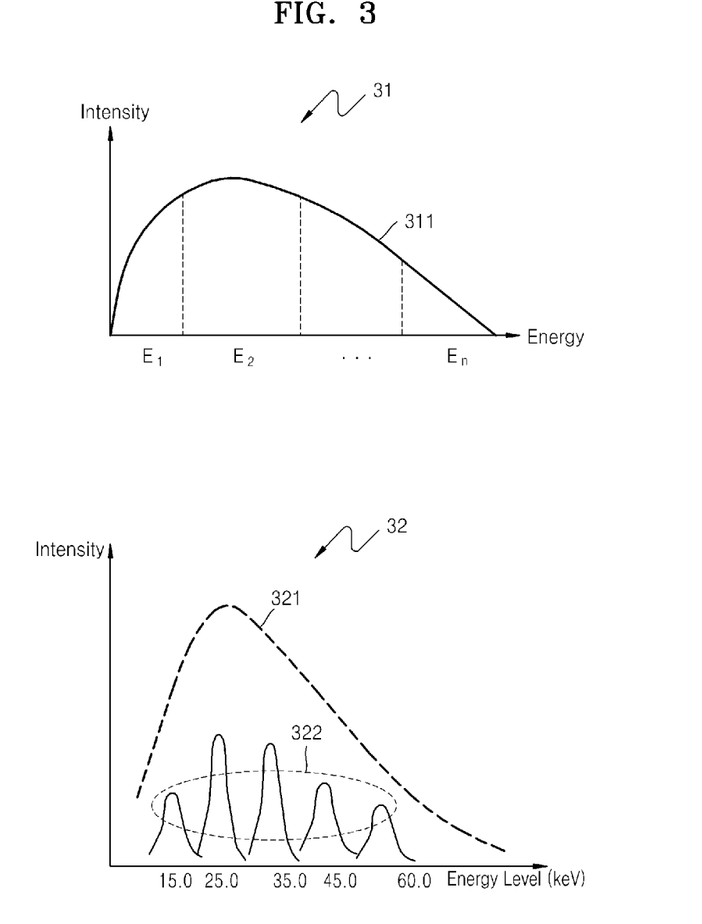
FIG. 3 is a diagram illustrating an example of a method for detecting a radiation image.

FIG. 3 illustrates an example of a method of detecting the radiation image.

Referring to FIGS. 2 and 3, graph 31 illustrates that the detection unit 105 detects the radiation image formed by passing through the subject for each of at least two energy bands. In other words, in the case that a single multi-energy radiation 311 is radiated to the subject, the detection unit detects the plurality of radiation images divided into the plurality of energy bands as illustrated in the graph 31.

However, the image processing apparatus 100 is not limited to the above technique of energy discriminating detection, but a source varying technique may also be applied to the image processing apparatus 100. According to the source varying technique, a plurality of radiations having different peak energies is radiated to the subject.

Referring to FIGS. 2 and 3, graph 32 illustrates that the detection unit 105 detects the radiation image formed by passing through the subject for each of at least two energy bands. In other words, in the case that a single multi-energy radiation 321 is divided into a plurality of radiations 322 having different peak energies by a splitter to be radiated to the subject, the detection unit 105 detects the plurality of radiation images formed by the plurality of radiations.

Therefore, the detection unit 105 may detect the radiation image formed by passing through the subject for each of at least two energy bands.

Figure 4:
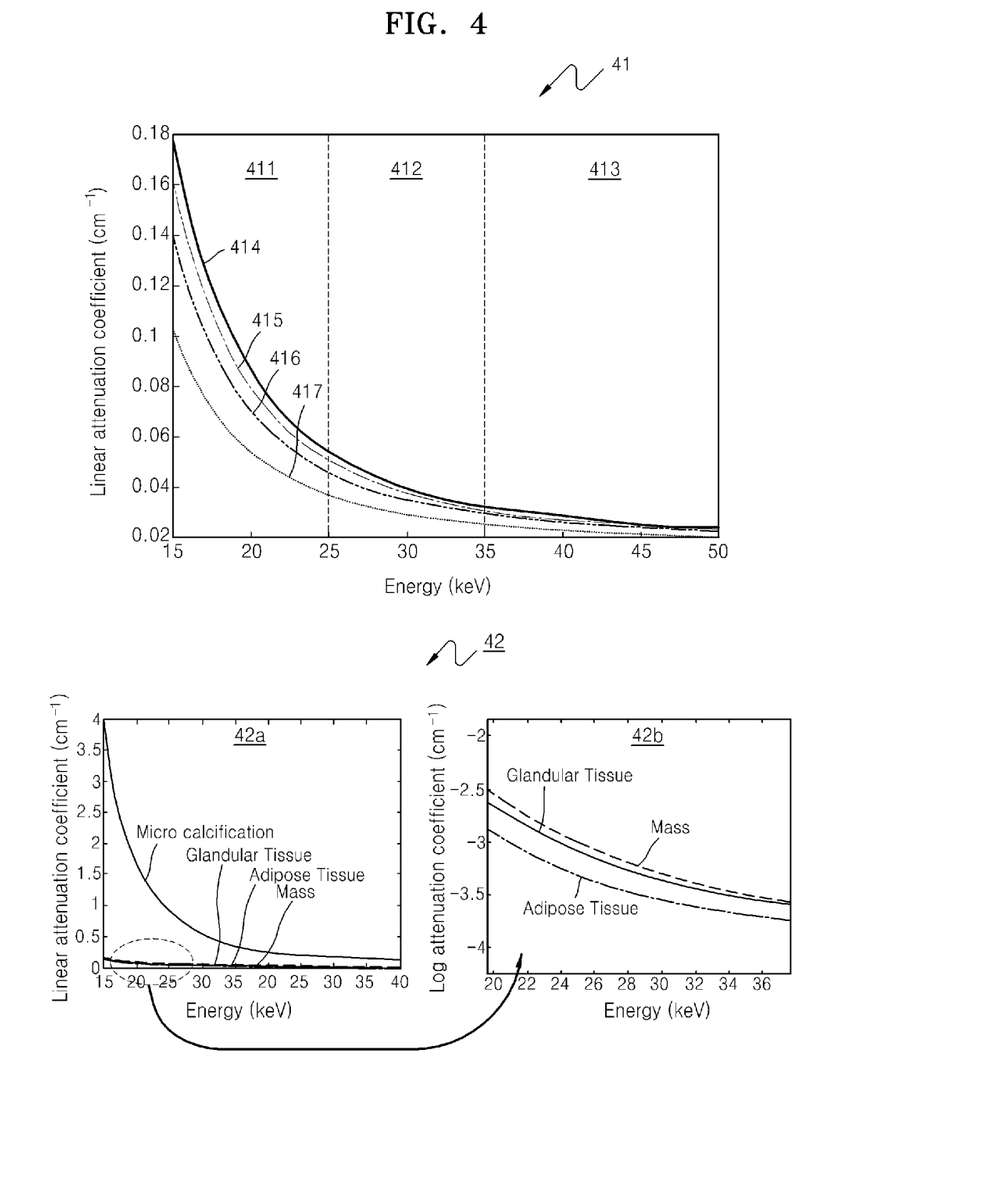
FIG. 4 is a diagram illustrating an example of a method for determining a reference point.

FIG. 4 illustrates an example of a method of determining the reference point. For example, the subject is a breast. Referring to FIG. 4, graphs 41, 42a, and 42b illustrate the radiation attenuation coefficients corresponding to energy bands of the tissues constituting the subject.

Referring to FIGS. 2 to 4, graph 41 illustrates a linear attenuation coefficient for each energy band of the tissues constituting the subject. In other words, the subject may include adipose tissues, glandular tissues, carcinoma, and fibrous tissues. Herein, the carcinoma may include Infiltrating Dutal Carcinoma (IDC) and masses. Graph 41 illustrates the attenuation coefficient for each energy band for each of the carcinoma and the masses.

For example, referring to graph 41, a curve 414 corresponds with the attenuation coefficient of the fibrous tissues, a curve 415 corresponds with the attenuation coefficient of the carcinoma, a curve 416 corresponds with the attenuation coefficient of the glandular tissues, and a curve 417 corresponds with the attenuation coefficient of the adipose tissues.

Accordingly, the reference determining unit 122 may determine the brightness level for differentiating the adipose tissues, the glandular tissues, the masses, and the fibrous tissues as the reference point by referring to graph 41. Therefore, the reference determining unit 122 may determine three reference points for dividing a gap between 0 and 1 to regions according to the four kinds of tissues.

The reference determining unit 122 may also determine the brightness level for differentiating the adipose tissues, the glandular tissues, the masses, and the fibrous tissues as the reference point for each of the plurality of radiation images detected by the detection unit 105.

For example, in the case that the energy bands for the plurality of radiation images detected by the detection unit 105 exist as a first band 411, a second band 412, and a third band 413, the reference determining unit 122 may determine two reference points for the first band 411, determine two reference points for the second band 412, and determine two reference points for the third band 413.

In another example, referring to FIGS. 2 to 4, graph 42a illustrates the linear attenuation coefficient for each energy band of the tissues constituting the subject, and graph 42b illustrates a log attenuation coefficient for each energy band of the tissues constituting the subject.

Referring to graph 42a, the subject may include the microcalcification tissues and soft tissues. Referring to graph 42b, which illustrates a part of the soft tissues of graph 42a to a log scale, the soft tissues may include the glandular tissues, adipose tissues, and masses. Although not illustrated in graphs 42a and 42b, it is understood that the subject may further include the fibrous tissues and the curve of the attenuation coefficient of the fibrous tissues exists between those of the microcalcification tissues and masses.

Accordingly, as described above with reference to graph 41, the reference determining unit 122 may determine the brightness level for differentiating the glandular tissues, adipose tissues, and masses as the reference point. The reference determining unit 122 may also determine the brightness level for differentiating the glandular tissues, adipose tissues, and masses as the reference point for each of the radiation images detected by the detection unit 105 as described above with reference to graph 41.

However, it is understood that the reference determining unit 122 may determine the brightness level for differentiating tissues further including the microcalcification tissues, the soft tissues, and the like as the reference point without being limited to the above description.

Therefore, the reference determining unit 122 may divide the low-frequency band component extracted by the extraction unit 110 to the plurality of regions according to the brightness level, and accordingly, the picture quality of the diagnosis image generated by the image processing apparatus 100 may be improved.

Figure 5:
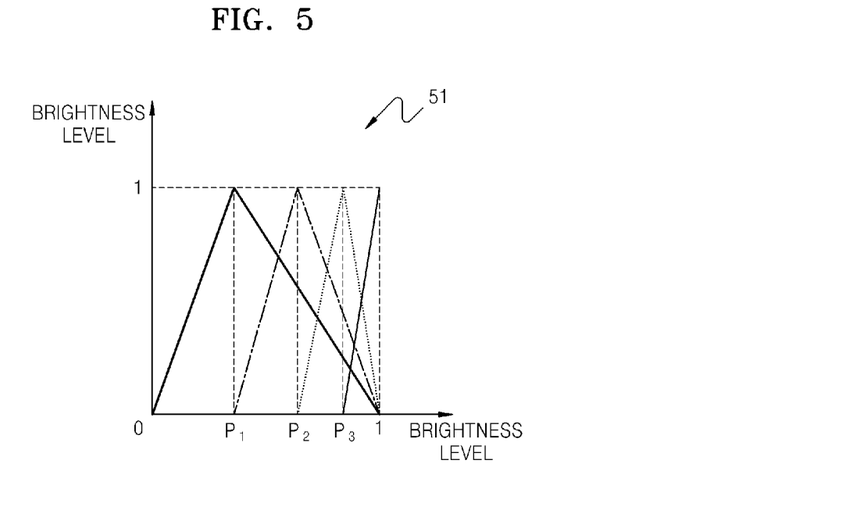
FIG. 5 is a diagram illustrating an example of a method for differently performing contrast stretching on the basis of the reference point.

FIG. 5 illustrates an example of a method of differently performing the contrast stretching on the basis of the reference point. Referring to FIG. 5, graph 51 corresponds with Equation (1). The x-axis of FIG. 5 corresponds with the brightness level of the input pixel normalized to 1, and the y-axis of FIG. 5 corresponds with the brightness level of the output pixel normalized to 1.

In other words, referring to FIGS. 2 to 5, the contrast stretching applying unit 124 applies the contrast stretching to each of the plurality of regions divided according to the reference point determined by the reference determining unit 122. Referring to graph 51, the reference points determined by the reference determining unit 122 may be $P_1$, $P_2$, and $P_3$. Accordingly, the low-frequency band component is divided into four regions based on the reference points $P_1$, $P_2$, and $P_3$.

The contrast stretching applying unit 124 performs the contrast stretching to the component having the lower brightness level than the reference point and the component having the higher brightness level than to the reference point in a different technique.

For example, in the case of the reference point $P_1$, it is understood that, at a region where the brightness level of the input pixel normalized to 1 is higher than 0 and lower than $P_1$, the contrast stretching applying unit 124 performs the contrast stretching to the component having the lower brightness level than $P_1$ and the component having the higher brightness level than $P_1$ in a different technique.

In other words, the contrast stretching is applied to the components where the brightness level of the input pixel normalized to 1 is higher than 0 and lower than $P_1$ so that the brightness level for the components is extended to have a range of 0 to 1.

The inverse contrast stretching is applied to the components where the brightness level of the input pixel normalized to 1 is higher than P1 and lower than 1, so that the brightness level for the components is extended to have a range of 0 to 1.

Furthermore, referring to Equations (3) and (4), the components, of which a brightness level is higher than P1 and lower than 1, applied by the inverse contrast stretching are re-inversed and then added to the components, of which a brightness level is higher than 0 and lower than $P_1$, to which the contrast stretching is applied.

As described above, by performing the contrast stretching to the region where the brightness level of the input pixel normalized to 1 is higher than 0 and lower than $P_1$, the bright part of the image becomes darkened and the dark part becomes brightened so that the picture quality may be improved.

Thus, the contrast stretching is performed to the components where the brightness level of the input pixel is higher than $P_1$ and lower than $P_2$, the components where the brightness level of the input pixel is higher than $P_2$ and lower than $P_3$, and the components where the brightness level of the input pixel is higher than $P_3$ and lower than 1.

However, in the case of the last reference point, for example, $P_3$, contrast stretching for the components having the brightness level lower than 1 may be performed.

Since the image processing apparatus 100 performs the contrast stretching to each of the plurality of regions in this manner, the image quality and resolution may be improved.

Figure 6:
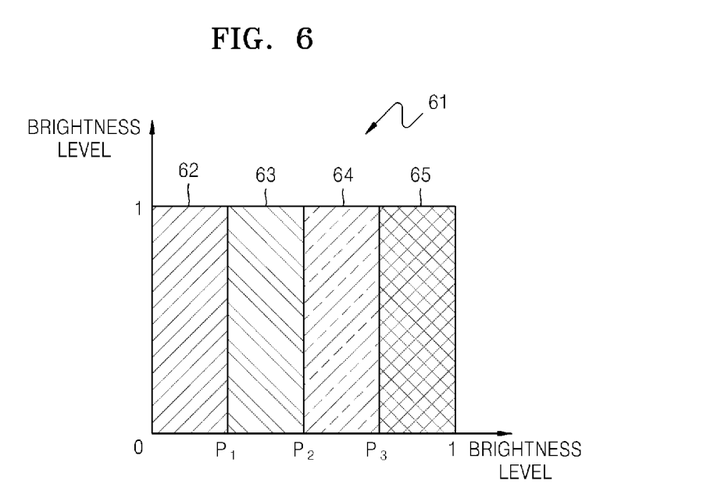
FIG. 6 is a diagram illustrating an example of a method for dividing a brightness level according to the reference point.

FIG. 6 illustrates an example of a method of dividing the brightness level according to the reference point. Referring to FIG. 6, graph 61 corresponds with Equation (2). The x-axis of FIG. 6 corresponds with the brightness level of the input pixel normalized to 1, and the y-axis of FIG. 6 corresponds with the brightness level of the output pixel normalized to 1.

In other words, referring to FIGS. 2 to 6, the contrast stretching applying unit 124 divides the brightness level according to the reference point determined by the reference determining unit 122. Referring to graph 61, the reference points determined by the reference determining unit 122 may be $P_1$, $P_2$, and $P_3$. Accordingly, the low-frequency band component may be divided into four regions of a first region 62, a second region 63, a third region 64, and a fourth region 65 by the reference points $P_1$, $P_2$, and $P_3$.

For example, in the case of the first region 62, when the contrast stretching applying unit 124 applies the contrast stretching to the component of which a brightness level of the input pixel normalized to 1 is higher than 0 and lower than $P_1$, it makes the brightness level of the first region 62 (for example, the region where the brightness level is higher than 0 and lower than $P_1$) become 1 and makes the brightness levels of the other regions become 0.

As described above with reference to FIG. 5, when the contrast stretching is applied to the components where the brightness level of the input pixel is higher than 0 and lower than $P_1$, the contrast stretching is applied to the region where the brightness level is higher than 0 and lower than $P_1$ and the region where the brightness level is higher than $P_1$ and lower than 1 in a different technique.

Referring to Equations (3) and (4), with regard to the region where the brightness level is higher than 0 and lower than $P_1$, the result of applying the contrast stretching to the region, where the brightness level is higher than 0 and lower than $P_1$, is multiplied by the result of dividing the brightness level. Further, with regard to the region where the brightness level is higher than $P_1$ and lower than 1, the result of dividing the brightness level is multiplied by the difference between the brightness level 1 and the result of applying the contrast stretching to the region, where the brightness level is higher than $P_1$ and lower than 1.

Accordingly, by performing the contrast stretching and dividing the brightness level for the region where the brightness level of the input pixel is higher than 0 and lower than $P_1$, the bright part of the image becomes darkened and the dark part becomes brightened so that the picture quality may be improved.

In this manner, the brightness level division is performed to the components where the brightness level of the input pixel is higher than $P_1$ and lower than $P_2$, the components where the brightness level of the input pixel is higher than $P_2$ and lower than $P_3$, and the components where the brightness level of the input pixel is higher than $P_3$ and lower than 1.

As described above, since the image processing apparatus 100 performs the contrast stretching and brightness level division to each of the plurality of regions, the image quality and resolution may be improved.

Figure 7:
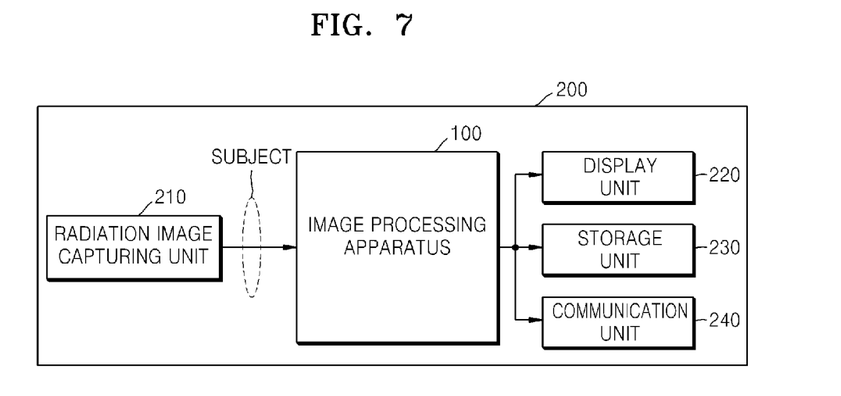
FIG. 7 is a diagram illustrating an example of a medical image system.

FIG. 7 illustrates an example of a medical image system 200. Referring to FIG. 7, the medical image system 200 includes a radiation image capturing unit 210, an image processing apparatus 100, a display unit 220, a storage unit 230, and a communication unit 240. The image processing apparatus 100 may be embodied with at least one processor.

Elements related to the medical image system 200 are illustrated in FIG. 7. However, it is understood that besides the elements illustrated in FIG. 7 other elements may be further included.

The medical image system 200 includes all image diagnosis systems using, for example, X-rays. For example, it may be a mammography image diagnosis system used for detecting the lesion of the breast tissues composed of soft tissues and not the bone in the human body.

The radiation image capturing unit 210 radiates a radiation having a broadband spectrum to the subject and obtains a plurality of radiation images at an energy discriminatable detector. It is understood that the radiation image capturing unit 210 may also obtain at least two radiation images for the subject by radiating the radiation of two or more different energy bands to the subject.

If the energy band of the radiation, for example, the X-rays, radiated to the same tissues of the subject is different, the absorption degree of the tissues is different. Based on these characteristics, the radiation image capturing unit 210 may obtain the plurality of radiation images where the attenuation characteristics for each energy band are reflected by radiating the X-rays of two or more energy bands to the tissues or using the energy discriminatable detector.

Also, the radiation image capturing unit 210 may include a radiation generating unit for irradiating the subject and a detection unit for detecting the radiation image formed by passing through the subject. However, in the case that the image processing apparatus 100 illustrated in FIG. 7 performs the detection operation, the radiation image capturing unit 210 may include the radiation generating unit for irradiating the subject.

The image processing apparatus 100 extracts the low-frequency band component and the high-frequency band component from the radiation images obtained from the radiation image capturing unit 210 or the radiation images detected after the radiation generated by the radiation image capturing unit 210 is passed through the subject. The image processing apparatus 100 performs the contrast enhancement process to the extracted low-frequency band component and performs the detail enhancement process to the extracted high-frequency band component. The image processing apparatus 100 synthesizes the image resulting from performing the contrast enhancement process and the image resulting from performing the detail enhancement process and generates the diagnosis image by reconstructing the synthesized image.

Also, the image processing apparatus 100 divides each low-frequency band component into the plurality of regions according to the brightness level and applies the contrast stretching to each of the divided regions. The image processing apparatus 100 also divides each high-frequency band component into the plurality of edge regions and noise regions according to the edge intensity and adaptively emphasizes the edge region according to the edge intensity included in each of the plurality of edge regions.

The image processing apparatus 100 illustrated in FIG. 7 may correspond to one embodiment of the image processing apparatus 100 illustrated in FIGS. 1 and 2. Accordingly, in connection with the image processing apparatus 100 illustrated in FIGS. 1 and 2, the above description for FIGS. 1 to 6 may also be applicable to the image processing apparatus 100 illustrated in FIG. 7, and thus overlapped explanations are omitted.

The display unit 220 may display the diagnosis image generated by the image processing apparatus 100. For example, the display unit 220 includes output devices, such as a display panel, a touch screen, and a monitor, and a software module for operating them provided to the medical image system 200.

Therefore, a user of the medical image system 200 may refer to the diagnosis image with an improved picture quality.

The storage unit 230 stores the diagnosis image generated by the image processing apparatus 100. For example, the storage unit 230 may be a general storage medium. It is understood that the storage unit 230 may include a Hard Disk Drive (HDD), Read Only Memory (RAM), Random Access Memory (RAM), flash memory, and a memory card.

The communication unit 240 transmits the diagnosis image generated by the image processing apparatus 100 to an external device and receives data from the external device. The external device may be another medical image system located at another location, a general computer system, a fax machine, or the like.

The communication unit 240 may transmits/receives data to/from the external device through a wired or wireless network. In a non-limiting example, the network may include the Internet, a Local Area Network (LAN), a Wireless LAN, Wide Area Network (WAN), a Personal Area Network (PAN), and the like. However, the network is not limited to the example and may be other kinds of networks for transmitting and receiving information.

It is also understood that the storage unit 230 and the communication unit 240 may further include image interpretation and search functions to be integrated into one body, such as a Picture Archiving Communication System (PACS).

Therefore, the medical image system 200 may display the diagnosis image, store it, and transmit it. Accordingly, examinees and medical professionals may obtain more accurate diagnosis information.

Figure 8:
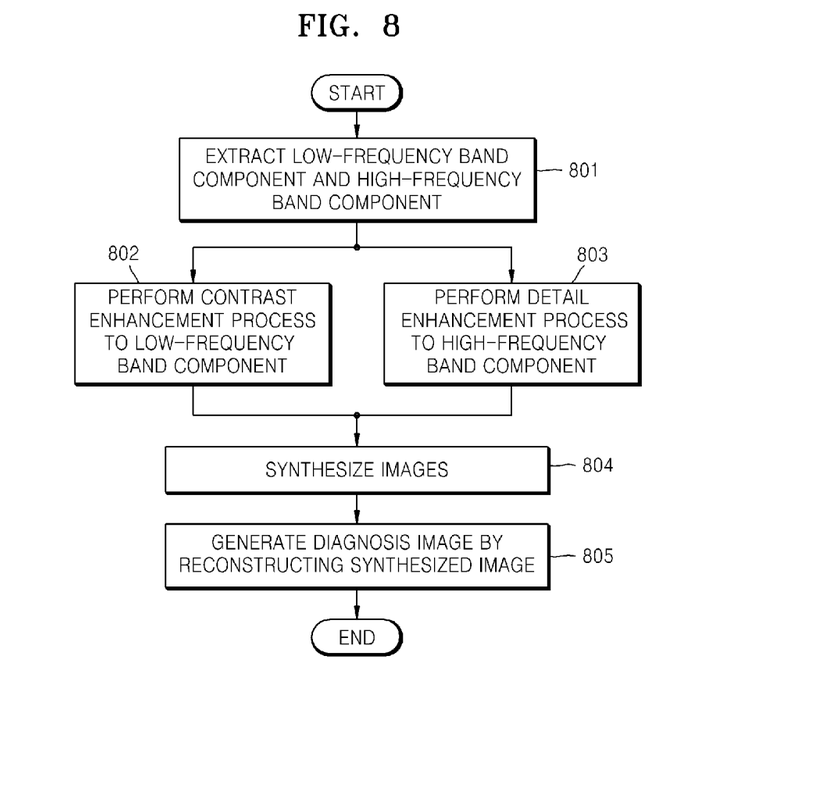
FIG. 8 is a flowchart illustrating one example of the image processing method.
Figure 9:
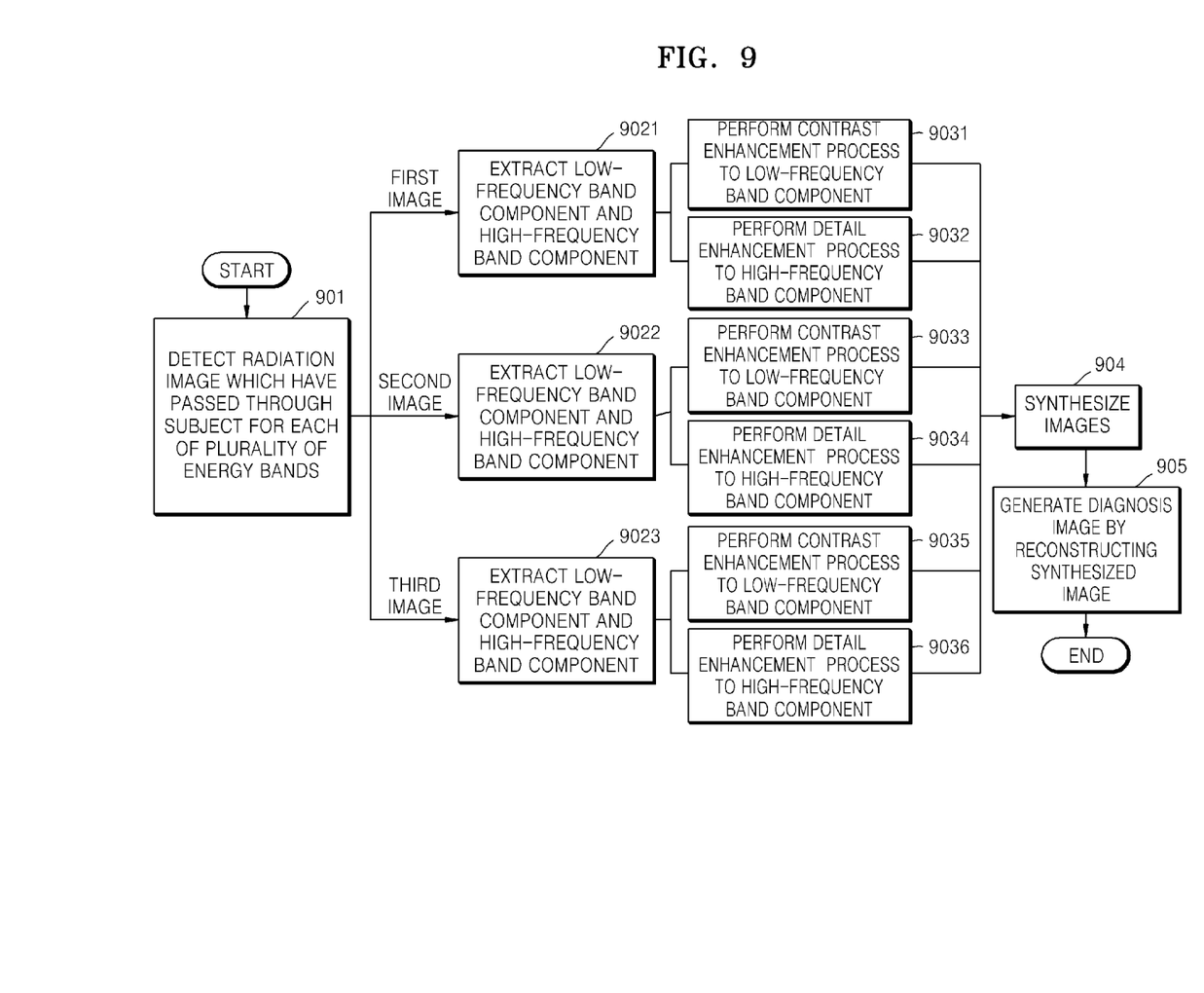
FIG. 9 is a flowchart illustrating another example of the image processing method.

FIGS. 8 and 9 illustrate examples of a method of processing the image. Referring to FIGS. 8 and 9, the image processing method includes time-series operations performed by the image processing apparatus 100 illustrated in FIGS. 1 and 2. Therefore, the above description for the image processing apparatus 100 illustrated in FIGS. 1 and 2 is also applicable to the image processing method illustrated in FIGS. 8 and 9 even though the description is omitted below.

FIG. 8 illustrates one example of the image processing method.

In operation 801, the extraction unit 110 extracts the low-frequency band component and the high-frequency band component from the radiation image formed by passing through the subject. The extraction unit 110 may perform the wavelet transform and the like to divide and extract the low-frequency band component and the high-frequency band component from the radiation image.

In operation 802, the contrast enhancement processing unit 120 performs the contrast enhancement process to the low-frequency band component extracted in operation 801. The contrast enhancement processing unit 120 may divide the low-frequency band component into the plurality of regions according to the brightness level and apply the contrast stretching to each of the divided plurality of regions.

In operation 803, the detail enhancement processing unit 130 performs the detail enhancement process to the high-frequency band component extracted in operation 801. The detail enhancement processing unit 130 may divide the high-frequency band component into the plurality of edge regions and noise regions according to the edge intensity and adaptively emphasize the edge region according to the edge intensity included in each of the plurality of edge regions.

In operation 804, the synthesis unit 140 synthesizes the image resulting from performing the contrast enhancement process in operation 802 and the image resulting from performing the detail enhancement process in operation 803. The synthesis unit 140 may synthesize the images based on the application of the fusion rule.

In operation 805, the generation unit 150 generates the diagnosis image by reconstructing the image synthesized in operation 804. In the case that the low-frequency band component and the high-frequency band component are extracted by performing the wavelet transform in operation 801, the generation unit 150 may generate the diagnosis image based on performing the inverse wavelet transform.

Accordingly, the image process for generating the diagnosis image with improved picture quality may be performed.

FIG. 9 illustrates another example of the image processing method.

In operation 901, the detection unit 105 detects the radiation images which have passed through the subject for each of the plurality of energy bands. In other words, if the externally generated radiation is passed through the subject, the detection unit 105 detects the radiation images for each of the plurality of energy bands. For example, the externally generated radiation may be the multi-energy X-rays and the detection unit 105 may be the energy discriminatable detector.

Although an example is described in which the detection unit 105 detects the radiation images for three energy bands, implementations are not limited thereto and the detection unit may detect less than three energy bands or more than three energy bands. Accordingly, the radiation images detected by the detection unit 105 may be the first image, the second image, and the third image.

In operation 9021, the extraction unit 120 extracts the low-frequency band component and the high-frequency band component from the first image which has passed through the subject. Next, in operation 9031, the contrast enhancement processing unit 120 performs the contrast enhancement process to the low-frequency band component extracted in operation 9021. In operation 9032, the detail enhancement processing unit 130 performs the detail enhancement process to the high-frequency band component extracted in operation 9021.

Operations 9022, 9033, and 9034 are performed to the second image, and operations 9023, 9035 and 9036 are performed to the third image.

In operation 904, the synthesis unit 140 synthesizes the image resulting from the performance of the contrast enhancement process in operations 9031, 9033, and 9035 and the image resulting from the performance of the detail enhancement process in operations 9032, 9034, and 9036.

In operation 905, the generation unit 150 generates the diagnosis image by reconstructing the image synthesized in operation 904.

Accordingly, the image processing apparatus 100 performs the image process generating the high-quality diagnosis image.

As described above, the diagnosis image with improved contrast and detail may be obtained. Therefore, medical professionals can better detect the lesions, their sizes, and positions from the subject.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
   an extraction unit configured to extract a low-frequency band component and a high-frequency band component from a radiation image formed by passing through a subject;
   a contrast enhancement processing unit configured to perform a contrast enhancement process to the extracted low-frequency band component;
   a detail enhancement processing unit configured to perform a detail enhancement process to the extracted high-frequency band component;
   a synthesis unit configured to synthesize an image resulting from performing the contrast enhancement process and an image resulting from performing the detail enhancement process; and
   a generation unit configured to reconstruct the synthesized image and generate a diagnosis image.

2. The image processing apparatus of claim 1, wherein the contrast enhancement processing unit comprises:
   a reference determining unit configured to determine a reference point for dividing the low-frequency band component into a plurality of regions according to a brightness level; and
   a contrast stretching applying unit configured to apply contrast stretching to each of the plurality of regions divided according to the determined reference point for the extracted low-frequency band component.

3. The image processing apparatus of claim 2, wherein the reference determining unit determines at least one reference point for dividing the low-frequency band component into the plurality of regions, and the reference point corresponds with a brightness level for differentiating tissues according to a radiation attenuation coefficient for each energy band of the tissues constituting the subject.

4. The image processing apparatus of claim 2, wherein the contrast stretching applying unit performs the contrast stretching to a component having a lower brightness level than the reference point and a component having a higher brightness level than the reference point in a different technique for each of the plurality of regions divided according to the reference point, divides the brightness level on the basis of the reference point for each of the plurality of regions, and applies the contrast stretching by using a result of performing the contrast stretching and a result of dividing the brightness level for each of the plurality of regions.

5. The image processing apparatus of claim 2, wherein the contrast enhancement processing unit further comprises an enhancement degree determining unit configured to determine a degree of enhancing contrast of the low-frequency band component.

6. The image processing apparatus of claim 5, wherein the enhancement degree determining unit determines the enhancing contrast degree based on a ratio indicating the contrast enhancement degree of the low-frequency band component, a weight for each of the plurality of regions divided from the low-frequency band component on the basis of the reference point, or a combination thereof.

7. The image processing apparatus of claim 5, wherein the contrast enhancement processing unit further comprises an adding unit configured to add the plurality of regions to which the contrast stretching is applied by referring to the determined contrast enhancement degree.

8. The image processing apparatus of claim 2, wherein a number of the reference point corresponds with a number of the plurality of regions.

9. The image processing apparatus of claim 1, wherein the detail enhancement processing unit comprises:
   a threshold value determining unit configured to determine a threshold value for dividing an edge region having directivity and a noise region not having directivity in the high-frequency band component; and
   an edge region emphasizing unit configured to emphasize the edge region resulting from the determined threshold value.

10. The image processing apparatus of claim 9, wherein the threshold value determining unit further determines at least one threshold value for dividing the edge region into a plurality of edge regions according to intensity of an edge included in the edge region, and the edge region emphasizing unit adaptively applies a degree of emphasis according to the intensity of the edge included in each of the plurality of edge regions resulting from the determined at least one threshold value.

11. The image processing apparatus of claim 10, wherein the edge region emphasizing unit increases the emphasis degree as the intensity of the edge included in each of the plurality of edge regions decreases.

12. The image processing apparatus of claim of claim 9, wherein the edge region emphasizing unit emphasizes the edge region by reducing the noise region resulting from the determined threshold value.

13. The image processing apparatus of claim 1, further comprising a detection unit configured to detect the radiation image formed by passing through the subject for each of at least two energy bands, wherein the extraction unit extracts the low-frequency band component and the high-frequency band component from each of the detected radiation images for each of the at least two energy bands.

14. The image processing apparatus of claim 1, wherein the contrast enhancement process is different from the detail enhancement process.

15. The image processing apparatus of claim 1, wherein the synthesis unit synthesizes the images based on a fusion rule.

16. A medical image system, comprising:
   a radiation image capturing unit configured to radiate a radiation to a subject and obtain a plurality of radiation images of the subject for a plurality of energy bands;
   an image processing apparatus configured to extract a low-frequency band component and a high-frequency band component from each of the obtained radiation images, perform a contrast enhancement process to the extracted low-frequency band component, perform a detail enhancement process to the extracted high-frequency band component, synthesize images resulting from performing the contrast enhancement process and images resulting from performing the detail enhancement process, and generate a diagnosis image based on reconstructing the synthesized image; and
   a display unit configured to display the generated diagnosis image.

17. The medical image system of claim 16, wherein the image processing apparatus divides each of the low-frequency band components into a plurality of regions according to a brightness level and applies contrast stretching to each of the divided plurality of regions.

18. The medical image system of claim 16, wherein the image processing apparatus divides each of the high-frequency band components into a plurality of edge regions and noise regions according to intensity of an edge and adaptively emphasizes the edge region according to the intensity of the edge included in each of the plurality of edge regions.

19. A method of processing an image, comprising:
   extracting a low-frequency band component and a high-frequency band component from a radiation image formed by passing through a subject;
   performing a contrast enhancement process to the extracted low-frequency band component;
   performing a detail enhancement process to the extracted high-frequency band component;
   synthesizing an image resulting from performing the contrast enhancement process and an image resulting from performing the detail enhancement process; and generating a diagnosis image based on reconstructing the synthesized image.

20. The method of claim 19, wherein the performing of the contrast enhancement process divides each of the low-frequency band components into a plurality of regions according to a brightness level and applies contrast stretching to each of the divided plurality of regions.

21. The method of claim 19, wherein the performing of the detail enhancement process divides each of the high-frequency band components into a plurality of edge regions and noise regions according to intensity of an edge and adaptively emphasizes the edge region according to the intensity of the edge included in each of the plurality of edge regions.

22. The method of claim 19, further comprising detecting the radiation image formed by passing through the subject for each of at least two energy bands, wherein the extracting extracts the low-frequency band component and the high-frequency band component from each of the detected radiation images for each of the at least two energy bands.

23. A non-transitory computer readable recording medium where a computer program for performing the method of claim 19 is stored.

24. A method of processing an image, comprising:
- detecting radiation images, formed by passing radiation through a subject, corresponding to each of a plurality of energy band components;
- extracting frequency band components corresponding with each of the energy band components for each radiation image;
- enhancing each of the frequency band components corresponding with one energy band component, each energy band component performing a different enhancing operation;
- synthesizing an image based on the enhancing operation of each frequency band component of each radiation image; and
- storing the synthesized image.

\* \* \* \* \*